United States Patent Office 3,138,571
Patented June 23, 1964

3,138,571
ANTIOXIDANTS AND ANTIOZONANTS
Ivan C. Popoff, Ambler, Pa., assignor to Pennsalt Chemicals Corporation, Philadelphia, Pa., a corporation of Pennsylvania
No Drawing. Filed Apr. 5, 1960, Ser. No. 20,015
22 Claims. (Cl. 260—45.9)

The invention relates to novel compounds which have both antioxidant and antiozonant properties. In particular, this invention deals with compounds having a urea or thiourea structure and which are derived from N,N'-substituted p-phenylenediamines. These novel compounds are of value in elastomeric compositions where they prevent adverse effects due to oxygen and ozone.

It is well known that natural and synthetic elastomers are subject to degradation due to both ozone and oxygen. Numerous compounds have been evaluated as antioxidants and antiozonants for elastomers and it has been found that good antioxidant and antiozonant properties are found in the class of p-phenylenediamines of structure

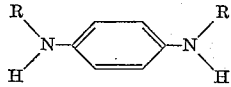

where the R groups represent alkyl, cycloalkyl or aryl radicals. For example,

N,N'-di-2-octyl-p-phenylenediamine,
N-phenyl-N'-cyclohexyl-p-phenylenediamine,
N,N'-bis-[3-(5-methylheptyl)]-p-phenylenediamine and
N,N'-di-sec-butyl-p-phenylenediamine are reported to have antioxidant and antiozonant properties when incorporated into elastomers. Unfortunately, however, this class of p-phenylenediamine derivatives presents a serious problem in actual use. Because these compounds discolor light stocks very badly, they can be used only in black rubber goods and even here, goods containing these agents often stain light-colored articles with which they come in contact.

It has now been found that essentially nondiscoloring elastomers protected against the adverse effects of oxygen and ozone can be obtained by incorporating the novel compounds of this invention. These novel compounds have the general structure:

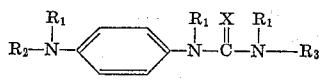

where $R_1$ is a member of the group of alkyl, alkenyl, cycloalkenyl, cycloalkyl, or aryl radicals, preferably alkyl radicals containing from one to twelve carbon atoms, $R_2$ is a member of the group of hydrogen, $R_1$ and

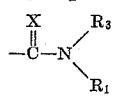

radicals, $R_3$ being selected from the group of $R_1$ and

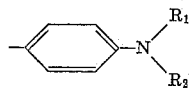

radicals, and X is an atom selected from the group of oxygen and sulfur.

These novel compounds are prepared quite readily in several ways depending upon the particular agent desired. One of the starting reactants may be a N,N'-disubstituted-p-phenylenediamine, i.e. a compound of structure

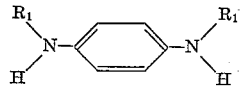

where $R_1$ is defined above. If the desired compound is to have the structure

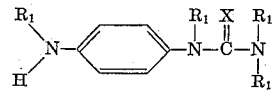

then one mole of the N,N'-disubstituted-p-phenylenediamine is reacted with about one mole of a N,N-dialkyl carbamyl or thiocarbamyl chloride; viz.:

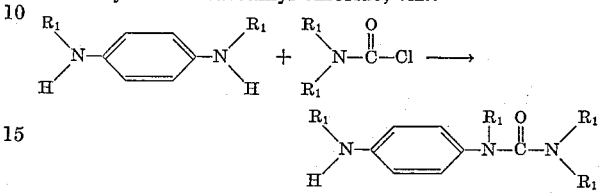

Use of two or more moles of the carbamyl chloride per mole of p-phenylenediamine derivative would, of course, yield the disubstituted compound

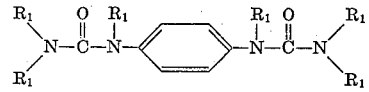

It is apparent that in this structure $R_2$ in the generic formula is a

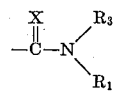

radical where $R_3$ is $R_1$. Compounds of this invention having these structures are exemplified by N,N'-diethyl-N-(N'',N''-dimethylcarbamyl)-p-phenylenediamine,
N,N'-di-sec-butyl-N,N'-bis(N'',N''-diethyl-thiocarbamyl-p-phenylenediamine,
N,N'-bis-[3-(5-methyl)heptyl]-N-(N'',N''-di-tert-butyl-thiocarbamyl)-p-phenylenediamine,
N,N'-di-dodecyl-N,N'-bis(N'',N''-di-cyclohexyl-carbamyl)-p-phenylenediamine,
N,N'-di-cyclohexyl-N,N'-bis(N'',N''-di-n-octylthio-carbamyl)-p-phenylenediamine,
N,N'-di-sec-butyl-N,N'-bis(N''-methyl,N''-ethyl carbamyl)-p-phenylenediamine,
N,N'-diphenyl-N,N'-bis(N'',N''-diethyl carbamyl)-p-phenylenediamine,
N,N'-di-p-tolyl-N,N'-bis(N'',N''-dimethylthiocarbamyl)-p-phenylenediamine,
N-methyl-N'-phenyl-N,N'-bis(N'',N''-dimethyl carbamyl)-p-phenylenediamine,
N,N'-diphenyl-N-(N'',N''-dimethylcarbamyl)-p-phenylenediamine,
N,N'-diallyl-N,N'-bis(N'',N''-diethylthiocarbamyl)-p-phenylenediamine,
N,N'-di-sec-butyl-(N'',N''-diallylthiocarbamyl)-p-phenylenediamine,
N,N'-di(methallyl)-N-(N'',N''-diethylthiocarbamyl)-p-phenylenediamine, and the like.

In like manner, a N,N,N'-tri-substituted p-phenylene may be the starting material reacted with the N,N-dialkylcarbamyl or thiocarbamyl chloride to give a product with the structure:

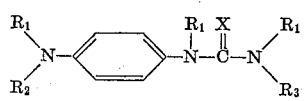

where $R_2$ and $R_3$ are both $R_1$ radicals as defined above. In this case one mole of the p-phenylenediamine derivative will be used per mole of carbamyl or thiocarbamyl chloride and the compounds thus obtained are exemplified by N,N,N'-tri-sec-butyl-N'-(N'',N''-di-n-propylcarbamyl)-p-pheneylenediamine,
N,N'-didodecyl, N-sec-butyl-N'-(N'',N''-diethyl-thiocarbamyl)-p-phenylenediamine,
N,N,N'-tris-[3-(5-methylheptyl)]-N'-(N'',N''-dicyclohexylthiocarbamyl)-p-phenylenediamine,
N-methyl-N,N'-diphenyl-N'-(N'',N''-diethylcarbamyl)-p-phenylenediamine, etc.

The process of preparing the above compounds is carried out quite easily by adding a solution of the carbamyl or thiocarbamyl chloride in an inert solvent (e.g. hydrocarbon or ethereal solvent) to a stirred solution of the p-phenylenediamine derivative. The reaction is usually carried out at somewhat elevated temperatures, say about 80° to 120° C. depending upon the solvent used. An acid acceptor such as an organic base (e.g. triethylamine, pyridine, $Na_2CO_3$, $NaHCO_3$, etc.) is usually present to assist completion of the reaction. When the addition is completed, the reaction mass is cooled, any insoluble inorganic matter is filtered off or washed off with water and the solvents and any excess reactants separated from the reaction product. The crude product residue is a brown, mushy matreial which is active "as is." It may be purified by crystallization from aqueous methyl or ethyl alcohol or by distillation at reduced pressures.

Still another variation and embodiment of this invention is the use in elastomers of novel antioxidants and antiozonant compounds obtained by reacting phosgene or thiophosgene with the N,N'-substituted p-phenylenediamine derivative. It will be understood that numerous variations are possible within this embodiment. For example, a N,N,N'-trisubstituted p-phenylenediamine may be reacted with phosgene or thiophosgene to yield compounds of structure:

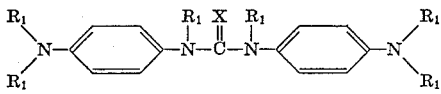

Specific compounds illustrating this class are those having the above structure where the $R_1$ radical is sec-butyl, 3-(5-methyl)heptyl-, n-octyl, cyclohexyl, allyl, methallyl, methylcyclohexyl, phenyl, tolyl, xylyl, etc. It will of course be understood that the $R_1$ radicals on the p-phenylenediamine derivative used need not be the same.

Another variation contemplated and embodied in this invention is represented by the reaction products of phosgene or thiophosgene with N,N'-disubstituted p-phenylenediamines. In this embodiment both the phosgene (and thiophosgene) and N,N'-disubstituted-p-phenylenediamine reagents are difunctional and when a 1:1 molar ratio of reactants is used, polymeric compounds will be formed. To illustrate further, such compounds will have a polymeric structure having the repeating units:

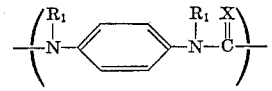

and in this case $R_2$ of the generic structure is

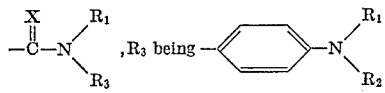

where $R_2$ is again

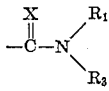

It will be understood, of course, that if the process is carried out under conditions of very high dilution (i.e. low concentration of reactants) ring compounds rather than polymers will be obtained.

Mole ratios other than 1:1 can be used, of course, as for example, 3 moles of the p-phenylenediamine derivative per 2 moles of phosgene to give a product of structure

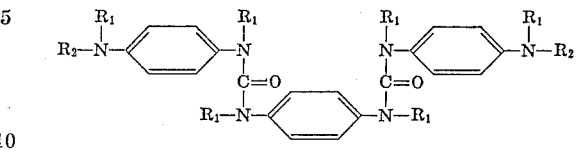

As stated above, the $R_2$ radicals in the above structural formulas may be the same or different.

The process employing phosgene or thiophosgene to yield these products is also readily carried out. The phosgene or thiophosgene, or a solution of these in an inert solvent, is added to a stirred solution of the p-phenylenediamine derivative containing an acid acceptor. As the addition is made, the reaction mass is held at temperatures of about 0° to 30° C. and after the addition is complete, the mass is heated to about 50° to 80° C. for one to three hours to ensure completion. The reaction mass is filtered and the filtrate distilled to obtain the crude product residue.

The preferred compounds of this invention are those of the generic structure where the $R_1$ radicals are alkyl or cycloalkyl radicals containing from one to twelve carbon atoms, where $R_2$ is H, and $R_3$ is $R_1$. When these $R_1$ radicals contain from one to about twelve carbon atoms, optimum antiozonant and non-discoloring effects are obtained.

The compounds prepared by the above techniques are in general, viscous oils, white solids or resin-like materials. These novel compounds are easily compounded into rubber stocks and need no special processing. The rubber materials with which they may be used include both synthetic and natural rubber. The synthetic rubbers may be any of the butadiene polymer rubbers such as styrene-butadiene rubber, polyisoprene, butadiene-acrylonitrile elastomers, and the like. Other synthetic rubbers such as the polysulfide rubbers (Thiokol), silicone rubbers, polychloroprene, polyisobutylene rubber, fluoroelastomers and the like are subject to ozone attack to a lesser extent than butadiene polymer rubbers, and the novel compounds of this invention may also be used to protect these rubbers against such ozone attack. The amount of novel compound incorporated in the rubber will vary between about 0.5% to 10% based on the rubber weight depending upon efficacy and economics of the agent used. In general, however, from about 0.75% to 3.0% will be used.

As indicated, these novel compounds show both antioxidant and antiozonant effects when incorporated into elastomers. In addition, these compounds may also be used as polymer stabilizers, which is a special antioxidant application. In this application the antioxidant protects the crude elastomer prior to processing and is used in either latices or in the solid elastomer. In addition to having nondiscoloring properties as mentioned above, these novel compounds are also characterized by having low volatility and low scorching tendencies and thus provide means for imparting to elastomers a combination of very desirable properties.

The following examples will serve to further describe and characterize the invention:

EXAMPLE 1

*N,N'-Bis[3-(5-Methyl)Heptyl]-N,N'-Bis-{p-[3-(5-Methyl)Heptyl]-Aminophenyl}Thiourea*

A solution of 17.5 g. (0.15 mole) of thiophosgene in 100 cc. n-hexane is added over a 2-hour period to a stirred solution held at 5° to 7° C. of 100 g. (0.3 mole) N,N' - bis[3 - (5 - methyl)heptyl] - p - phenylenediamine and 60 g. (0.6 mole) triethylamine in 250 cc. n-hexane. The reaction mixture is refluxed for 1 hour at 70° to 75°

C., cooled to 5° C. and is filtered to remove the triethylamine hydrochloride. The filtrate is washed with water, dried with $Na_2SO_4$ and is distilled to remove the solvent and the excess of triethylamine. The distillation residue of 107 g. is a brown resinous solid melting at 73° to 100° C., and is the crude product which has the structure

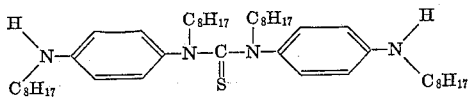

EXAMPLE 2

*N,N'-Di-Sec-Butyl-N-(N'',N''-Diethylthiocarbamyl)-p-Phenylenediamine*

A. A solution of 32 g. (0.2 mole) N,N-diethylthiocarbamyl chloride in 200 cc. toluene is added slowly over a 5-hour period into a stirred solution of 44 g. (0.2 mole) of N,N'-di-sec-butyl-p-phenylenediamine and 40 g. (0.4 mole) triethylamine in 100 cc. toluene at 110° C. The cooled reaction mixture is filtered to remove the triethylamine hydrochloride formed. The filtrate is then distilled to remove the solvent and the excess of triethylamine. The distillation residue of 68 g. is a brown mushy product, which is the crude product and has the structure

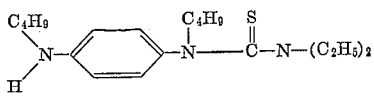

The crude product is recrystallized from 80% alcohol to obtain a white solid having a M.P. 67–68° C. containing 9.56% S and 12.78% N (theory 9.56% S and 11.99% N) and a secondary nitrogen atom as determined by infrared.

B. A solution of 83.5 g. of 95% N,N-diethylthiocarbamyl chloride (0.52 mole, containing 5% free sulfur) in 140 g. methyl ethyl ketone is added to a refluxing mixture of 110 g. N,N'-di-sec-butyl-p-phenylenediamine (0.5 mole), 127 g. sodium carbonate and 120 g. methyl ethyl ketone over a 6-hour period. The refluxing is continued for additional 6 to 7 hours at about 80°–81° C. The gases evolved are absorbed in a potassium hydroxide solution to determine that about theoretical amount of carbon dioxide is formed. The cooled reaction mixture is filtered to remove the inorganic salts. The filtrate is distilled to remove the solvent. The distillation residue is the crude N,N'-di-sec-butyl-N-(N'',N'' - diethylthiocarbamyl) - p-phenylenediamine obtained in 100% yield.

C. The reaction described in Example 2B is modified by using 300 cc. water instead of 140 g. methyl ethyl ketone and by addition of the molten N,N-diethylthiocarbamyl chloride. The reaction temperature is 50° C. After the reaction is completed the organic layer is separated and dried to obtain the crude N,N'-di-sec-butyl-N-(N'',N''-diethylthiocarbamyl)-p-phenylenediamine in 98.5% yield.

EXAMPLE 3

*N,N'-Di-Sec-Butyl-N-(N'',N''-Dimethylthiocarbamyl)-p-Phenylenediamine*

A solution of 39.0 g. (0.31 mole) N,N-dimethylthiocarbamyl chloride in 50 g. (0.5 mole) triethylamine is added to a refluxing solution of 66.0 g. (0.3 mole) N,N'-di-sec-butyl-p-phenylenediamine in 100 cc. xylene and 50 g. (0.5 mole) triethylamine over a 2.5 hour period. After additional 5 hours refluxing, the cooled reaction mixture is filtered to remove the triethylamine hydrochloride found in 100% yield. The filtrate is distilled to remove the solvent and the excess of triethylamine. The distillation residue is the crude N,N'-di-sec-butyl-N-(N'', N''-dimethylthiocarbamyl)-p-phenylenediamine obtained in 100% yield.

EXAMPLE 4

*N,N'-Di-Sec-Butyl-N-(N'',N''-Diethylcarbamyl)-p-Phenylenediamine*

54.2 g. (0.4 mole) N,N-diethylcarbamyl chloride is added to a refluxing mixture at 88.0 g. (0.4 mole) N,N'-di-sec-butyl-p-phenylenediamine, 80 g. (0.8 mole) triethylamine and 100 cc. toluene over a 1-hour period while stirring; the reaction mixture is refluxed for additional 26 hours, cooled and filtered to remove the triethylamine hydrochloride obtained in 93% yield. The filtrate is distilled to remove the organic solvent and the excess of triethylamine. The distillation residue, 126.0 g. (98.5%) is the crude N,N'-di-sec-butyl-N'(N'',N'' - diethylcarbamyl)-p-phenylenediamine having a M.P. 85–95° C.

EXAMPLE 5

*N,N'-Bis[3-(5-Methyl)Heptyl]-N,N'-Bis{p-[3-(5-Methyl)Heptyl]-Aminophenyl}Urea*

A solution of 36.3 g. (0.365 mole) phosgene in 250 g. ether is added to an ice-cooled solution of 220 g. (0.66 mole) N,N'-bis[3-(5-methyl)heptyl]-p-phenylenediamine in 100 g. (1.0 mole) triethylamine and 500 cc. ether over a 3.5 hour period while stirring; after an additional 16-hour stirring at room temperature, the reaction mixture is washed with water to remove the triethylamine hydrochloride and the dried ether solution is evaporated to remove the solvent. The distillation residue, 210.4 g. (92% yield) of a very viscous oil, is the crude N,N'-bis[3-(5-methyl)heptyl]-N,N'-bis{p-[3-(5-methyl) - heptyl]aminophenyl}urea.

EXAMPLE 6

*Reaction Product of N,N'-Bis[3-(5-Methyl)Heptyl]-p-Phenylenediamine and Phosgene in 1:1 Mole Ratio*

The reaction is carried out as described in Example 5 using 29.5 g. (0.25 mole) phosgene in ether, 83.0 g. (0.25 mole) N,N' - bis[3 - (5-methyl)-heptyl]-p-phenylenediamine and 101 g. (1.0 mole) triethylamine. The distillation residue, 90 g. (100%) of a very viscous oil, is the crude reaction product which is primarily a low molecular weight polymer of structure

EXAMPLE 7

*Reaction Product of N,N'-Bis[3-(5-Methyl)Heptyl]-p-Phenylenediamine and Thiophosgene in 1:1 Mole Ratio*

This product is obtained by the same procedure as described in Example 6 by using thiophosgene instead of phosgene. The product is a resinous solid melting at 76° to 105° C.

EXAMPLE 8

*N,N'-Di-Sec-Butyl-N,N'-Bis(N'',N''-Diethylthiocarbamyl)-p-Phenylenediamine*

This product is obtained in 100% yield by the same procedure as described in Example 2 using 62 g. (0.4 mole) of N,N-diethylthiocarbamyl chloride instead of 32 g. N,N'-di-sec-butyl-N,N'-bis(N'',N''-diethylthiocarbamyl)-p-phenylenediamine melts at 146–148° C. Infrared analysis of the compound confirms the structure of the compound by showing the absence of secondary nitrogen atoms.

EVALUATION OF ANTIOZONANTS
*Antiozonant Effects*

Two parts per hundred parts of rubber of the antiozonant are added to the following base rubber compound:

| | Parts |
|---|---|
| SBR-1500 | 100 |
| HAF black | 50 |
| ZnO | 5 |
| Stearic acid | 3 |
| Petroleum residue softener | 10 |
| Sulfur | 2 |
| N-cyclohexyl-2-benzothiozolesulfenamide | 1 |

Sheets are prepared and press cured 60 minutes at 150° C. Specimens are stretched 20% and exposed at 37.8° C. to ozone at a concentration of 50 parts per one hundred million. The time is noted for the first crack to appear on either one of the four sides of the specimen. An "antiozonant factor" is obtained by comparing this time with the time necessary for the first crack to appear on a specimen containing no antiozonant. A control with no antiozonant is taken as 1.0 and a value higher than 1.0 for the "antiozonant factor" indicates antiozonant protection.

*Antioxidant Testing*

One part per hundred parts of rubber of the compound to be tested is mixed on the mill with the following rubber compound:

|  | Parts |
|---|---|
| Smoked sheet blend (Hevea) | 100 |
| CaCO$_3$ | 75 |
| ZnO | 10 |
| Stearic acid | 2 |
| Sulfur | 3 |
| Diphenylguanidine (DPG) | 1.5 |

Three samples of the milled product are then press cured for 15, 30, and 60 minutes respectively at 138° C. and tensile strength of all three cures measured before and after aging four days in an oxygen bomb held at 70° C. The sum of the percent of retained tensile after aging for each sample is the DPG-Stock antioxidant index.

A second antioxidant index (MBTS-Stock) is obtained in the same way, but press curing at 148° C. and seven-day bomb aging at 70° C., with the following rubber compound:

|  | Parts |
|---|---|
| Pale crepe (Hevea) | 100 |
| CaCO$_3$ | 50 |
| TiO$_2$ | 20 |
| ZnO | 10 |
| Stearic acid | 2 |
| Sulfur | 3 |
| Bis(2-mercaptobenzothiazolyl) disulfide (MBTS) | 1 |

These antioxidant indices are reported separately and the higher the index the better the antioxidant activity.

*Polymer Stabilization*

An aqueous suspension of the product to be tested is added to an antioxidant-free rubber latex (SBR-1502) in amount equivalent to 1.25% by weight of the rubber. After mixing thoroughly and coagulating the latex, the rubber is dried and aged at 100° C. for four days. During the aging, the test sample is examined every 24 hours and evaluated for hardness, color, state of cure and state of fusion. Comparison is made with a stabilizer-free blank which usually becomes hard and brittle after 24 to 48 hours' aging.

*Scorch Testing*

A base rubber compound of the following composition is prepared:

|  | Parts |
|---|---|
| Pale crepe | 100 |
| Calcium carbonate | 50 |
| Zinc oxide | 10 |
| Titanium dioxide | 20 |
| Stearic acid | 2 |
| Spider sulfur | 3 |
| Bis(2-mercaptobenzothiazolyl) disulfide (MBTS) | 1 |

One part per hundred parts of rubber of the antiozonant is added to the above rubber compound to obtain test rubber samples. The time in minutes is measured for a 5-unit Mooney viscosity increase for each of the samples at 128° C. or at 138° C. The longer the time for the rise the less the scorching tendencies.

*Volatility Testing*

A known amount (between 2 and 3 grams) of each compound tested is placed in a Petri dish and the percent weight loss is determined after exposure in a hot air circulating oven held at 121° C.

*Discoloration Tests*

One part per hundred parts of rubber of each product tested is added to the following base rubber compound:

|  | Parts |
|---|---|
| Pale crepe | 100 |
| Calcium carbonate | 50 |
| Zinc oxide | 10 |
| Titanium dioxide | 20 |
| Stearic acid | 2 |
| Spider sulfur | 3 |
| MBTS | 1 |

Sheets are press cured 30 minutes at 150° C. One half of each 1 x 4 inch specimen is exposed to a sunlamp for 48 hours. The discoloration of the specimen is compared with the discoloration of the blank specimen and rated.

The data obtained in the above tests are presented in Table I which follows. Table I also gives the results of these tests on several prior art antioxidants and antiozonants which are structurally related to the novel compounds of this invention.

TABLE I

| Compound of Example No. | Antiozonant Factor | Antiozonant Index | | Polymer Stabilization | Color of Treated Elastomer | Scorch, Minutes for 5 Point Rise at— | | Volatility, Percent Loss of 250° F. after— | | |
|---|---|---|---|---|---|---|---|---|---|---|
| | | DPG Stock | MBTS Stock | | | 128° C. | 138° C. | 2 hrs. | 8 hrs. | 24 hrs. |
| Blank | 1.0 | 87 | 75 | Very poor | | | 19.3 | | | |
| 1 | 1.6 | 228 | 108 | ___do___ | Fair | 22.3 | | 5.1 | 7.7 | 10.2 |
| 2-A (Crude) | 1.8 | 250 | 156 | Excellent | Good | 29.0 | | 7.0 | 15 | 17 |
| 2-A (M.P. 67°–68° C.) | 2.0 | | | ___do___ | Excellent | | 18.3 | | | |
| 3 | 1.5 | | 140 | ___do___ | Good | | | 6.0 | 12 | 19 |
| 4 | 1.2 | 224 | 185 | | Very good | | | | | |
| 5 | 3.0 | | 199 | Very good | Fair | 38.3 | | | | |
| 6 | 4.0 | | 182 | ___do___ | ___do___ | | 15.2 | 1.7 | 3.3 | 5.5 |
| 7 | 1.5 | | | ___do___ | | | 19.0 | 2.1 | 2.9 | 5.8 |
| 8 | 1.2 | 212 | 100 | | Very good | | | 4.4 | 6.6 | 9.2 |
| Note 1 | 7.2 | 240 | 58 | Poor | ___do___ | 33.1 | 4.5 | 60 | 98 | |
| Note 2 | 6.0 | 238 | 106 | Very good | ___do___ | 8.3 35.7 | 17.5 | 1.5 | 9.0 | 30 |

NOTE 1.—N,N'-di-sec-butyl p-phenylenediamine.
NOTE 2.—N,N'-bis-3(5-methyl)heptyl-p-phenylenediamine.

The following additional examples will serve to further illustrate and characterize the novel compounds of this invention:

EXAMPLE 9

*N,N'-Diisopropyl-N-(N'',N'''-Diethylthiocarbamyl)-p-Phenylenediamine*

A solution of 16.7 g. (0.11 mole) of N,N-diethylthiocarbamyl chloride in 50 cc. of toluene is added over a 6-hour period to a refluxing solution of 19.2 g. (0.1 mole) N,N'-diisopropyl-p-phenylenediamine in 100 cc. of toluene and 25.0 g. (0.25 mole) of triethylamine. The reaction mixture is filtered at room temperature to remove 14.7 g. (100%) of triethylamine hydrochloride formed as by-product. The filtrate is evaporated, the distillation residue being the crude product. It is recrystallized from 80% alcohol to obtain the pure product melting at 90°–91° C.

*Analysis.*—Found: 66.7% C, 9.07% H, 13.4% N. Calculated for $C_{17}H_{29}N_3S$: 66.4% C, 9.4% H, 13.6% N.

The product has an antiozonant factor of 1.5–2.0.

EXAMPLE 10

*N,N'-Diisopropyl-N,N'-Bis(N'',N'''-Diethylthiocarbamyl)-p-Phenylenediamine*

A solution of 19.2 g. (0.1 mole) N,N'-diisopropyl-p-phenylenediamine, 31.0 g. (0.205 mole) N,N-diethylthiocarbamyl chloride, 40.0 g. (0.4 mole) triethylamine and 100 cc. toluene is refluxed for 4 hours. The solution is then filtered at room temperature to remove the triethylamine hydrochloride formed. The filtrate is evaporated, the residue being the crude product which has an antiozonant index of 1.5–2.0.

EXAMPLE 11

*N,N'-Bis[3-(5-Methyl)Heptyl]-N-(N'',N'''-Dimethylthiocarbamyl)-p-Phenylenediamine*

A solution of 12.5 g. (0.1 mole) of N,N-dimethylthiocarbamyl chloride in 50 cc. xylene is added over a 7-hour period to a refluxing solution of 33.2 g. (0.1 mole) N,N'-bis[3-(5-methyl)heptyl]-p-phenylenediamine in 20.0 g. (0.2 mole) triethylamine and 50 cc. xylene. The refluxing is continued for an additional 8 hours; the reaction mass is filtered and the filtrate is evaporated, the residue being the crude product. It has an antiozonant factor of 2.0–2.5.

EXAMPLE 12

*N,N'-Bis[3-(5-Methyl)Heptyl]-N,N'-Bis(N'',N'''-Dimethylthiocarbamyl)-p-Phenylenediamine*

A solution of 33.2 g. (0.1 mole) N,N'-bis[3-(5-methyl)heptyl]-p-phenylenediamine, 40.0 g. (0.4 mole) triethylamine, 100 cc. xylene and 25.0 g. (0.2 mole) N,N-dimethylthiocarbamyl chloride is refluxed 14 hours. The reaction mixture is filtered at room temperature to remove 26.4 g. (96%) of triethylamine hydrochloride formed. The filtrate is evaporated and the distillation residue is the crude product. It has an antiozonant factor of 1.5

EXAMPLE 13

*N,N'-Di-Sec-Butyl-N,N'-Bis(N'',N'''-Dimethylthiocarbamyl)-p-Phenylenediamine*

A solution of 33.0 g. (0.15 mole) N,N'-di-sec-butyl-p-phenylenediamine, 50.0 g. (0.5 mole) triethylamine, 100 cc. xylene and 39.0 g. (0.31 mole) N,N-dimethylthiocarbamyl chloride is refluxed for 9 hours. The triethylamine hydrochloride formed is filtered off and the filtrate is evaporated to yield a product residue of 54.0 g. having an antiozonant factor of 1.5.

EXAMPLE 14

*N,N'-Di-Sec-Butyl-N-(N'',N''-Dibutylthiocarbamyl)p-Phenylenediamine and N,N'-Di-Sec-Butyl-N,N'-Bis(N'',N''-Dibutylthiocarbamyl)-p-Phenylenediamine*

These compounds are prepared by procedures similar to those described above using a solution of N,N-dibutyl-thiocarbamyl chloride. Both products are active antiozonates have an antiozonant factor of 1.5.

EXAMPLE 15

*N,N'-Diphenyl-N-(N'',N'''-Diethylthiocarbamyl)-p-Phenylenediamine*

To a refluxing mixture of 39.0 g. (0.15 mole) N,N'-diphenyl-p-phenylenediamine in 200 cc. xylene there is added a solution of 23.0 g. (0.15 mole) N,N-diethylthiocarbamyl chloride in 50 cc. xylene and 50.0 g. (0.5 mole) triethylamine over a 10-hour period. Refluxing is continued for an additional 15 hours, the reaction mass is cooled to room temperature and filtered to remove the triethylamine hydrochloride formed. The filtrate is evaporated to remove the solvent and the excess of triethylamine. The distillation residue, 53.0 g. (94%) is the crude product which upon recrystallization from acetone melts at 120–126° C. It has an antiozonant factor of 1.0–1.5.

EXAMPLE 16

*N-Phenyl-N'-o-Tolyl-N,N'-Bis-(N'',N'''-Diethylthiocarbamyl)-p-Phenylenediamine*

A solution of 67.0 g. (0.25 mole) of N-phenyl-N'-o-tolyl-p-phenylenediamine, 76.0 g. (0.5 mole) N,N-diethylthiocarbamyl chloride, 101 g. (1.0) mole) triethylamine and 200 cc. xylene is refluxed for 8 hours. The reaction mixture is filtered at room temperature to remove 113.5 g. of solids which are washed with water to dissolve 65.8 g. (96%) triethylamine hydrochloride. The insoluble product of 47.6 g. (37.7%) melted at 163–170° and has an antiozonant factor of 1.5.

EXAMPLE 17

*N,N'-Diphenyl-N,N'-Bis(N'',N'''-Diethylthiocarbamyl)-p-Phenylenediamine*

A mixture of 39.0 g. (0.15 mole) N,N'-diphenyl-p-phenylenediamine, 46.0 g. (0.3 mole) N,N-diethylthiocarbamyl chloride and 60.0 g. (0.6 mole) triethylamine in 300 cc. xylene is refluxed for 15 hours. The reaction mixture is filtered at room temperature to remove 87.8 g. of solids, which are washed with water to obtain 47.1 g. (64%) of water insoluble N,N'-diphenyl-N,N'-bis(N'', N'''-diethylthiocarbamyl)-p-phenylenediamine, M.P. 192–200° C. The filtrate from the 87.8 g. is evaporated in vacuo and the distillation residue is 29.5 g. of crude N, N' - diphenyl - N,N' - bis(N'',N''' - diethylthiocarbamyl) - p-phenylenediamine.

The product (M.P. 192–200° C.) has an antiozonant factor of 1.5.

EXAMPLE 18

*N-Phenyl-N'(N'',N'''-Diethylthiocarbamyl-N'-o-Tolyl-p-Phenylenediamine*

To a refluxing solution of 67.0 g. (0.25 mole) N-phenyl-N'-o-tolyl-p-phenylenediamine in 50.0 g. (0.5 mole) triethylamine and 300 cc. xylene there is added a solution of 38.0 g. (0.25 mole) N,N-diethylthiocarbamyl chloride in 100 cc. of xylene over a 5-hour period. The refluxing is continued for additional 2 hours and the reaction mixture then is filtered to remove 34.0 g. (99%) of triethylamine hydrochloride. The filtrate is evaporated to remove the excess of triethylamine and the solvent. The residue of 97.0 g. (99.5%) is the crude product.

The data of the above examples show that the novel compounds of this invention have good antioxidant and antiozonant effects. Furthermore, the associated properties of these novel antiozonants made them of great value in elastomer processing and it is clear that this invention represents a significant advance in the art.

It will be understood by the skilled art worker that many variations can be made from the above description and examples without departing from the spirit and scope of the invention and accordingly this invention is

I claim:

1. Compounds having the structure

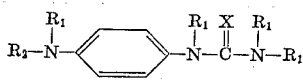

where $R_1$ is a member selected from the group consisting of alkyl, alkenyl, cycloalkenyl, cycloalkyl, and aryl radicals, said $R_1$ radicals containing from one to twelve carbon atoms, $R_2$ is a member of the group consisting of hydrogen, $R_1$, and

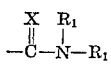

radicals, and X is an atom selected from the group consisting of oxygen and sulfur.

2. Novel compounds having the structure

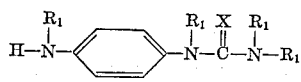

where $R_1$ is a member selected from the group consisting of alkyl, alkenyl, cycloalkyl, cycloalkenyl and aryl radicals containing from one to twelve carbon atoms, and X is an atom selected from the group consisting of oxygen and sulfur.

3. N,N' - di - sec-butyl-N-(N'',N'''-diethylthiocarbamyl)-p-phenylenediamine.

4. N,N' - di - sec-butyl-N-(N'',N'''-dimethylthiocarbamyl)-p-phenylenediamine.

5. N,N' - di - sec-butyl-N-(N'',N'''-diethylcarbamyl)-p-phenylenediamine.

6. N,N' - diisopropyl - N-(N'',N'''-diethylthiocarbamyl)-p-phenylenediamine.

7. N,N' - diphenyl - N-(N'',N'''-diethylthiocarbamyl)-p-phenylenediamine.

8. Novel compounds having the structure

where $R_1$ is a member selected from the group consisting of alkyl, alkenyl, cycloalkyl, cycloalkenyl and aryl radicals containing from one to twelve carbon atoms and X is an atom selected from the group consisting of oxygen and sulfur.

9. N,N' - di - sec-butyl-N,N'-bis (N'',N'''-diethylthiocarbamyl)-p-phenylenediamine.

10. N,N' - diisopropyl - N,N'-bis(N'',N'''-diethylthiocarbamyl)-p-phenylenediamine.

11. An elastomer composition selected from the group consisting of natural and synthetic rubber containing from about 0.5% to about 10% based on the weight of the elastomer of a compound defined in claim 1.

12. An elastomer composition as in claim 11 where the compound is N,N'-di-sec-butyl-N-(N'',N'''-diethylthiocarbamyl)-p-phenylenediamine.

13. An elastomer composition as in claim 1 where the compound is N,N'-di-sec-butyl-N-(N'',N'''-dimethylthiocarbamyl)-p-phenylenediamine.

14. An elastomer composition as in claim 11 where the compound is N,N'-di-sec-butyl-N-(N'',N'''-diethylcarbamyl)-p-phenylenediamine.

15. An elastomer composition as in claim 11 where the compound is N,N'-di-sec-butyl-N,N'-bis(N'',N'''-diethylthiocarbamyl)-p-phenylenediamine.

16. An elastomer composition as in claim 11 where the compound is N,N'-diisopropyl-N-(N'',N'''-diethylthiocarbamyl)-p-phenylenediamine.

17. An elastomer composition as in claim 11 where the compound is N,N'-diisopropyl-N,N'-bis(N'',N'''-diethylthiocarbamyl)-p-phenylenediamine.

18. A butadiene polymer rubber containing from about 0.5% to 10% by weight based on the weight of the rubber of a compound as defined in claim 1.

19. A butadiene polymer rubber containing from about 0.5% to 10% by weight based on the weight of the rubber of N,N'-di-sec-butyl-N-(N'',N'''-diethylthiocarbamyl)-p-phenylenediamine.

20. Natural rubber containing from about 0.5% to 10% by weight based on the weight of the rubber of a compound as defined in claim 1.

21. Polyisoprene rubber containing from about 0.5% to 10% by weight based on the weight of the rubber of a compound as defined in claim 1.

22. A compound of the formula

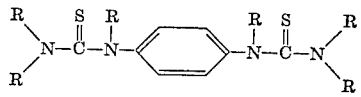

in which R is a member selected from the group consisting of alkyl of 1 to 8 carbon atoms, cycloalkyl having 6 ring carbon atoms and monocarbocyclic aryl hydrocarbon.

References Cited in the file of this patent
UNITED STATES PATENTS

| | | |
|---|---|---|
| 2,361,339 | White | Oct. 24, 1944 |
| 2,875,175 | Ambelang | Feb. 24, 1959 |
| 2,883,362 | Rosenwald et al. | Apr. 21, 1959 |
| 2,960,988 | Tamblyn et al. | Nov. 15, 1960 |
| 2,993,044 | Applegath et al. | July 18, 1961 |

OTHER REFERENCES

Conant and Blatt: 3rd edition (1947), page 332.

UNITED STATES PATENT OFFICE
CERTIFICATE OF CORRECTION

Patent No. 3,138,571
June 23, 1964
Ivan C. Popoff

It is hereby certified that error appears in the above numbered patent requiring correction and that the said Letters Patent should read as corrected below.

Column 3, line 25, for "matreial" read -- material --; columns 7 and 8, TABLE I, in the heading to the third column, for "Antiozonant Indes" read -- Antiozonant Index --; same table, under the heading "Color of Treated Elastomer" last two lines thereof, for "do", each occurrence, read -- Very poor --.

Signed and sealed this 3rd day of November 1964.

(SEAL)
Attest:

ERNEST W. SWIDER
Attesting Officer

EDWARD J. BRENNER
Commissioner of Patents

Disclaimer 3,138,571.—*Ivan C. Popoff*, Ambler, Pa. ANTIOXIDANTS AND ANTIOZONANTS. Patent dated June 23, 1964. Disclaimer filed Oct. 5, 1964, by the assignee, *Pennsalt Chemicals Corporation*.

Hereby enters this disclaimer to claims 1, 11, 18, 20 and 21 of said patent.

[*Official Gazette January 5, 1965.*]